US008302472B2

(12) United States Patent  (10) Patent No.: US 8,302,472 B2
Rumpf  (45) Date of Patent: Nov. 6, 2012

(54) FUEL DELIVERY UNIT WITH A FILLING LEVEL SENSOR OPERATING WITH ULTRASONIC WAVES

(75) Inventor: Bernd Rumpf, Nidderau-Windecken (DE)

(73) Assignee: Continental Automotive GmbH, Hannover (DE)

( * ) Notice: Subject to any disclaimer, the term of this patent is extended or adjusted under 35 U.S.C. 154(b) by 421 days.

(21) Appl. No.: 12/677,046

(22) PCT Filed: Sep. 4, 2008

(86) PCT No.: PCT/EP2008/061694
§ 371 (c)(1),
(2), (4) Date: Mar. 8, 2010

(87) PCT Pub. No.: WO2009/034009
PCT Pub. Date: Mar. 19, 2009

(65) Prior Publication Data
US 2010/0186500 A1  Jul. 29, 2010

(30) Foreign Application Priority Data
Sep. 7, 2007  (DE) .......................... 10 2007 042 559

(51) Int. Cl.
*G01F 23/00* (2006.01)
(52) U.S. Cl. .................................................... 73/290 V
(58) Field of Classification Search ................ 73/290 V; 340/621
See application file for complete search history.

(56) References Cited

U.S. PATENT DOCUMENTS

| 6,427,532 | B1 | 8/2002 | Keller | |
| 6,629,457 | B1 | 10/2003 | Keller | |
| 7,213,456 | B2 | 5/2007 | Rollwage et al. | |
| 2004/0079149 | A1* | 4/2004 | Sawert et al. | ............... 73/290 V |
| 2004/0187569 | A1* | 9/2004 | Rollwage et al. | ........... 73/290 V |
| 2006/0144139 | A1 | 7/2006 | Miyagawa | |

FOREIGN PATENT DOCUMENTS

| DE | 196 17 496 | 11/1997 |
| DE | 196 17 496 A1 | 11/1997 |
| DE | 199 42 379 | 3/2001 |
| DE | 103 12 101 | 9/2004 |
| EP | 1 081 471 | 3/2001 |
| JP | 2006-189343 A | 7/2006 |

* cited by examiner

*Primary Examiner* — Hezron E Williams
*Assistant Examiner* — Nathaniel Kolb
(74) *Attorney, Agent, or Firm* — Cozen O'Connor

(57) ABSTRACT

A fuel delivery unit for insertion into a fuel tank of a motor vehicle has a swirl pot, a flange for closing an opening in the fuel tank, and a support element arranged between the flange and the swirl pot that prestresses the swirl pot towards a bottom of the fuel tank. A filling level sensor is arranged on the swirl pot. The swirl pot has at least one receptacle. The receptacle extends to a bottom of the swirl pot and completely surrounds the periphery of the support element and has an opening in the bottom region through which fuel from the fuel tank can enter the receptacle. The filling level sensor comprises a transmission and receiving unit for ultrasonic waves arranged in the fuel delivery unit such that the ultrasonic waves run in the receptacle and the support element.

14 Claims, 2 Drawing Sheets

FUEL DELIVERY UNIT WITH A FILLING LEVEL SENSOR OPERATING WITH ULTRASONIC WAVES

CROSS REFERENCE TO RELATED APPLICATION

This is a U.S. national stage of application No. PCT/EP2008/061694, filed on Sep. 4, 2008. Priority is claimed on German Application No.: 10 2007 042 559.9 filed Sep. 7, 2007 the content of which is incorporated herein by reference.

BACKGROUND OF THE INVENTION

1. Field of the Invention

The subject of the present invention is a fuel delivery unit that can be inserted into a fuel tank of a motor vehicle, comprising a swirl pot, a flange for closing off an opening in the fuel tank, at least one support element designed as a hollow profile arranged between the flange and the swirl pot that preloads the swirl pot against the base of the fuel tank comprising a filling level sensor arranged on the swirl pot.

2. Description of the Prior Art

Fuel delivery units of this type are frequently inserted into fuel tanks of modern motor vehicles and have therefore long been known. The support elements are generally tubes or rods which are pressed into receptacles arranged on a flange. A swirl pot has bores that correspond to the support elements in which the support elements slide. The swirl pot is pre-loaded against the base of the fuel tank by at least one spring element arranged around a support element. The pre-loading provides a base reference for the filling level sensor, since the filling level sensor for determining the fuel quantity is often arranged on the swirl pot. Lack of a base reference would lead to an erroneous filling level measurement, since the base of the fuel tank bends as a function of the weight of the fuel, as a result of which the spacing between the base and the upper boundary wall of the fuel tank is dependent on the filling level in the fuel tank.

DE 199 42 379 A1 discloses a device for measuring filling levels by ultrasound. For better signal transmission and signal evaluation, a rigid measuring tube is provided in the fuel tank. Therefore, both a filling-level-dependent change in the spacing between the base and the upper boundary wall of the fuel tank and also production-related tolerances in the range of several millimeters have the result that the measuring tube cannot be arranged optimally up to directly below the upper boundary wall of the fuel tank. The sound waves and their reflections must therefore run through the fuel tank in a partially unguided manner.

SUMMARY OF THE INVENTION

The invention is based on creating a fuel delivery unit that enables a precise determination of the filling level in a fuel tank, with wave guidance being enabled over the entire running path in particular in the case of ultrasound being used. Furthermore, the fuel delivery unit is of a simple design.

According to one embodiment of the invention, the swirl pot has at least one receptacle for at least one support element, in which receptacle the support element slides when the spacing between the flange and swirl pot changes. The receptacle is formed as far as the base of the swirl pot and completely surrounds the circumference of the support element. The receptacle has an opening in the base region, via which opening fuel can enter into the receptacle from the fuel tank. The filling level sensor has a transmitting and receiving unit for ultrasound waves and the transmitting and receiving unit is arranged in the fuel delivery unit such that the ultrasound waves run in the receptacle and in the support element.

As a result of the receptacle for the support element being formed as far as the base of the swirl pot and the transmitting and receiving unit for ultrasound being arranged such that the ultrasound waves run in the receptacle and in the support element, the receptacle and support element serve as a measuring tube. A separate measuring tube may therefore be dispensed with. As a result of the saving of the separate measuring tube, the fuel delivery unit according to one embodiment of the invention can be produced cost-effectively. The design of the components of receptacle and support element in the form of a telescopic arrangement furthermore ensures that a measuring tube is created which, independently of production tolerances and filling-level-dependent spacings between the base and upper boundary wall of the fuel tank, ensures a guided propagation of the ultrasound waves over the entire height. This is made possible by the support element, as a result of its connection to the flange, extends into the direct vicinity of the upper boundary wall.

In one advantageous refinement, the transmitting and receiving unit is arranged in the region of the upper end of the support element in the installed position of the fuel delivery unit, as a result of which the transmitting and receiving unit is arranged close to the flange of the fuel delivery unit. This refinement firstly enables the transmitting and receiving unit to be pre-assembled, with the support element. Secondly, on account of the arrangement close to the flange, the electrical connecting lines can be relatively short and therefore less susceptible to failure.

In an improved embodiment, the transmitting and receiving unit is arranged in the flange, in particular in a bush of the flange, in which the support element is arranged with its upper end. This enables integration of the transmitting and receiving unit into the flange. Electrical connecting lines in the fuel tank may be dispensed with if the electrical connections are designed as an electrical leadthrough to the flange outer side.

In a further advantageous refinement, the transmitting and receiving unit is arranged in the lower region, preferably on the base of the receptacle, of the support element in the installed position of the fuel delivery unit. With this arrangement, the measurement takes place through the fuel. As a result, the transmitting and receiving unit can be operated with a relatively low level of power.

The arrangement of the transmitting and receiving unit with the flange or the swirl pot is realized in a particularly reliable manner by a cohesive connection, preferably by extrusion coating, welding or adhesive bonding. In particular, extrusion coating has the advantage that the transmitting and receiving unit is thereby reliably protected from fuel and its aggressive constituents, with those regions of the transmitting and receiving unit which transmit and receive the ultrasound waves being excluded from the extrusion coating.

A compact design, which is therefore insusceptible to failure, is realized in that the transmitting and receiving unit has evaluating electronics which are designed such that an electrical signal corresponding to the filling level can be generated on the basis of the ultrasound waves.

If the transmitting and receiving unit is arranged in the swirl pot, protection of the evaluating electronics is realized in that the evaluating electronics are arranged remote from the transmitting and receiving unit, preferably in the flange. To be protected from aggressive constituents of the fuel, the evaluating electronics in the flange may be arranged in a housing formed in the flange. It is however also conceivable for a chamber to be provided in the base region of the swirl pot, in which chamber the evaluating electronics are arranged remote from the transmitting and receiving unit.

In a further advantageous refinement, the evaluating electronics are arranged separately in a hermetically sealed housing, wherein the printed circuit board or the ceramic which bears the evaluating electronics may be a constituent part of the housing which is connected in a pressure-tight and liquid-tight manner to a lid.

To ensure that propagation of the ultrasound waves at the transition from the support element to the receptacle and vice versa is as undisturbed as possible, the support element and the receptacle have the same cross-sectional shape. The cross-sectional shape may be selected as desired, for example round, oval, or rectangular.

For a measurement of the filling level, the filling level in the receptacle and in the support element should be the same as the filling level in the fuel tank. The known arrangement of the support element on the flange can result in a dynamic pressure building up in the support element, as a result of which the filling level in the receptacle and in the support element differ from the filling level in the fuel tank. It has therefore proven to be advantageous to provide an opening in the bush for holding the support element and/or in the support element, via which opening the interior of the support element is connected to the surroundings in the fuel tank. In the simplest case, the opening is formed as a bore.

BRIEF DESCRIPTION OF THE DRAWINGS

The invention will be explained in more detail on the basis of two exemplary embodiments. In the figures.

DETAILED DESCRIPTION OF THE PREFERRED EMBODIMENTS

Figure 1:
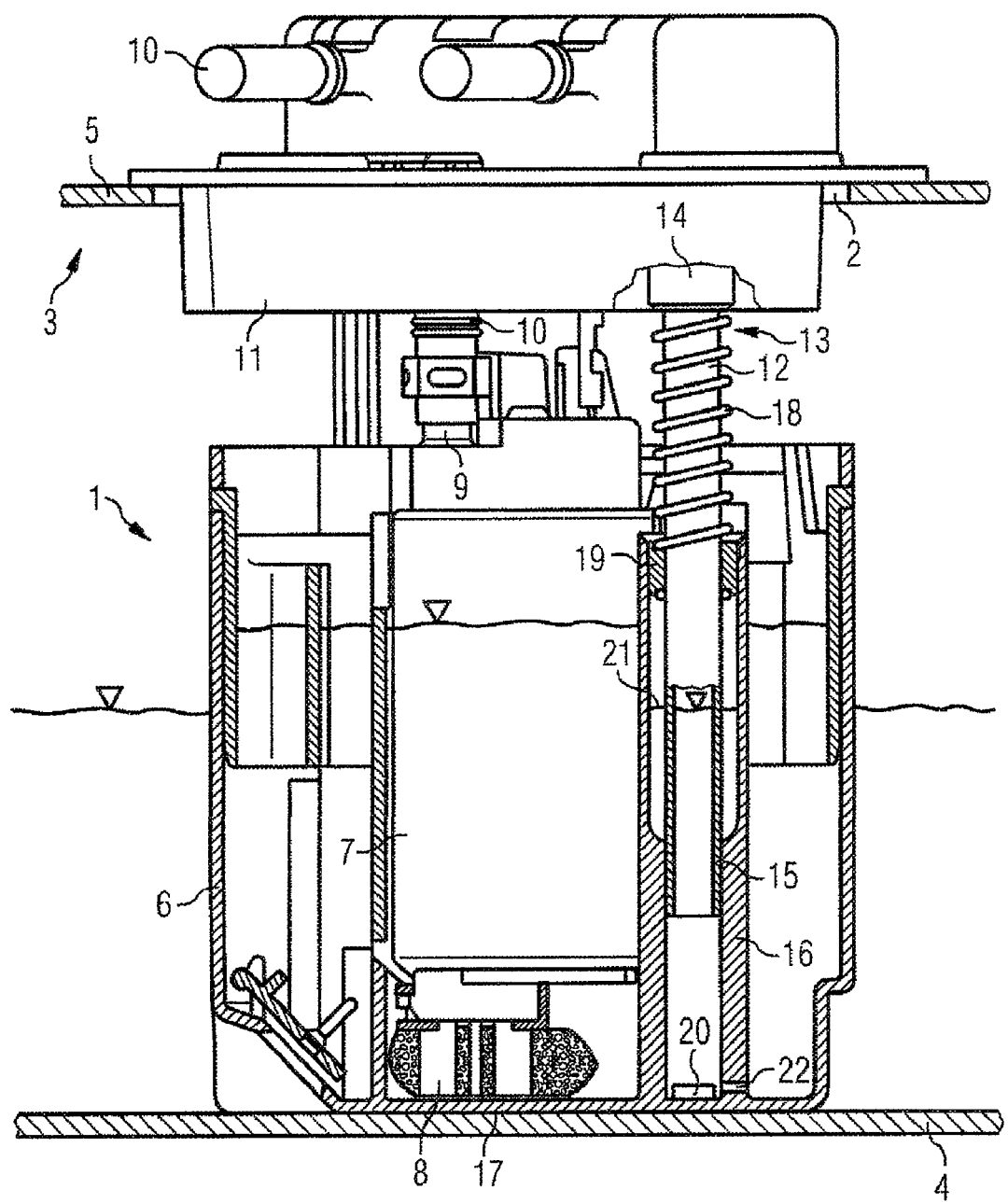
FIG. 1: is a fuel delivery unit according to one embodiment of the invention in a fuel tank.

The fuel delivery unit 1 in FIG. 1 is inserted through an opening 2 into a fuel tank 3. The fuel tank 3 has a base 4 and an upper boundary wall 5. The fuel delivery unit 1 has a swirl pot 6, in which a fuel pump 7 is arranged, and a flange 11 which closes off the opening 2. The fuel pump 7 draws fuel from the swirl pot 6 via a pre-filter 8 and delivers the fuel via an outlet 9 into a feed line 10 which leads through the flange 11 to an internal combustion engine (not illustrated) of a motor vehicle.

The flange 11 and the swirl pot 6 of the fuel delivery unit 1 are connected to one another by a support element 12 designed as a circular tube. The connection to the flange 11 takes place by the upper region 13 of the tube 12. The upper region 13 is pressed into a bush 14 of the flange 11. The lower end 15 of the tube 12 is arranged in a receptacle 16 with a circular cross section, such that the tube 12 can slide along the receptacle 16. The receptacle 16 extends as far as the base 17 of the swirl pot 6. A helical spring 18 is arranged on the outside of the tube 12 so as to be supported against the bush 14 of the flange 11 and against a counter bracket 19 which is fastened to the receptacle 16. The helical spring 18 ensures a preload of the swirl pot 6 against the base 4 of the fuel tank 3.

Arranged on the base of the receptacle 16 is a transmitting and receiving unit 20 that emits ultrasound waves through the fuel in the direction of the flange 11. The ultrasound waves are reflected at the filling level limit 21. The reflected ultrasound waves are detected by the transmitting and receiving unit 20 and are fed to evaluating electronics (not illustrated) in which an electrical signal corresponding to the filling level is generated on the basis of the ultrasound waves.

The filling level in the receptacle 16 corresponds to the filling level in the fuel tank 3. The equality of the two filling levels is ensured by means of a bore 22 that connects the interior of the receptacle 16 to the surroundings in the fuel tank 3. For better illustration, the bore has been rotated 90° to the right into the plane of the drawing.

The filling level in the swirl pot 6 is higher than the two filling levels in the receptacle 16 and in the fuel tank 3, since the swirl pot 3 is permanently filled with fuel from the fuel tank 3 by a suction jet pump (not illustrated).

Figure 2:
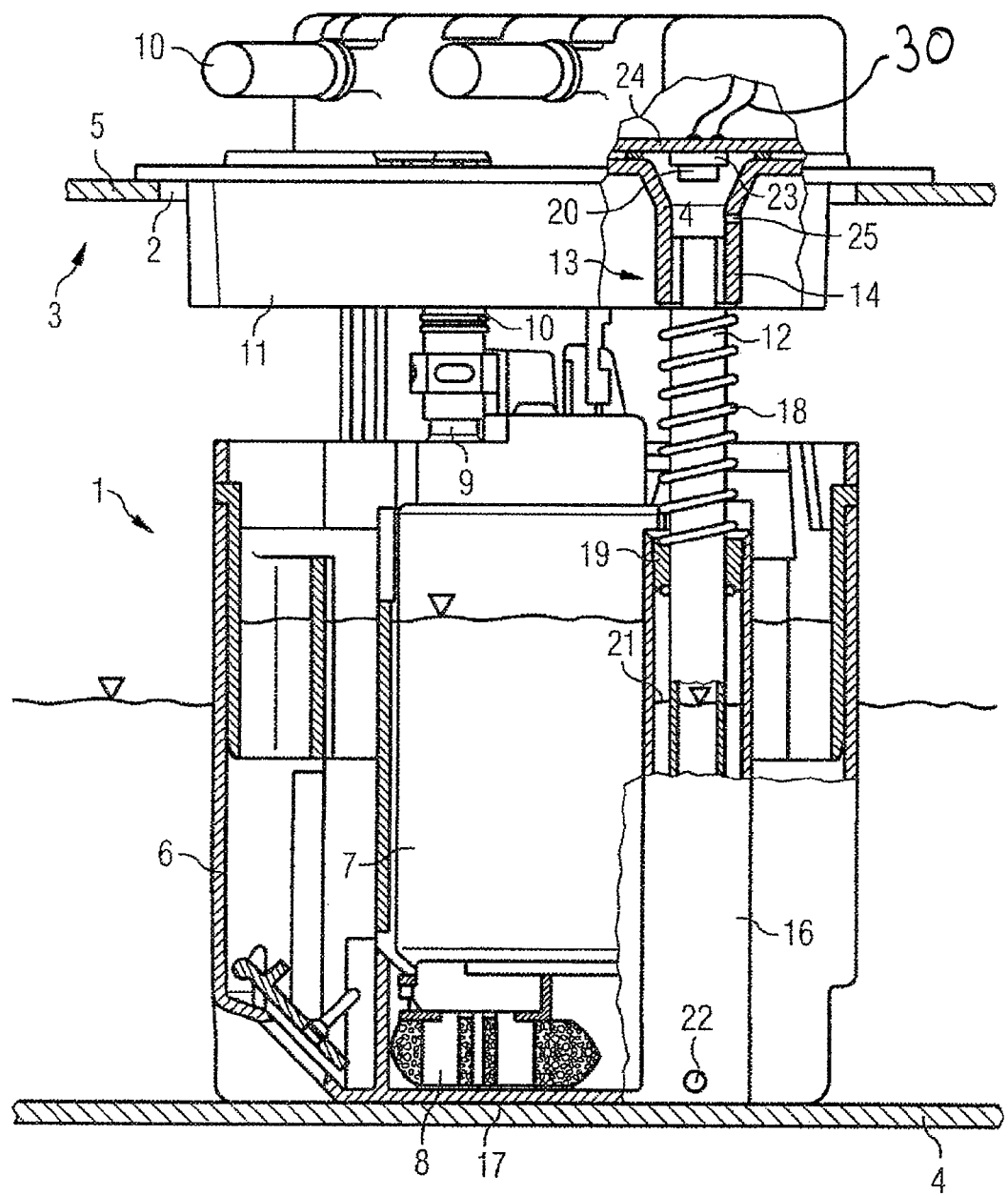
FIG. 2: is a second embodiment of the fuel delivery unit according to FIG. 1.

The fuel delivery unit 1 in FIG. 2 corresponds in terms of its basic design to that in FIG. 1. The difference consists in the arrangement of the transmitting and receiving unit 20 which emits the ultrasound waves in the direction of the swirl pot 6 and detects the ultrasound waves reflected at the filling level limit 21.

The transmitting and receiving unit 20, is connected together with evaluating electronics 23 to form a unit. The unit is arranged on a carrier 24 which is fastened in the flange 11. Electrical connecting and signal lines 30 lead from the evaluating electronics 23 to an electrical leadthrough (not illustrated) in the flange 11. It is however also possible for the unit with the evaluating electronics 23 to be injection-molded into the flange in the region of the bush 14 in order to thereby fasten the evaluating electronics 23 in the flange 11 in a protected fashion.

Arranged in the bush 14 is a bore 25 which connects the interior of the tube 12 to the surroundings in the fuel tank 3. Bore 25 provides pressure compensation between the fuel tank 3 and the interior of the tube 12 and of the receptacle 16 in order to ensure equal filling levels at all times. The bore 22 in the lower region of the receptacle 16 is illustrated in its correctly positioned arrangement.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A fuel delivery unit configured to be inserted into a fuel tank of a motor vehicle, comprising:
   a swirl pot having at least one substantially vertical receptacle formed as far as a base of the swirl pot, the at least one receptacle having an opening arranged in a base region proximate to the base of the swirl pot through which opening fuel can enter into the at least one receptacle from the fuel tank;
   a flange configured to close an opening in the fuel tank;
   at least one support element having a hollow profile arranged between the flange and the swirl pot configured to preload the swirl pot against a base of the fuel tank, the at least one support element supported and slideably received in the at least one receptacle, such that the at least one receptacle completely surrounds a circumference of the at least one support element; and a filling level sensor arranged on the swirl pot, the filling level sensor comprises a transmitting and receiving unit for transmitting and receiving ultrasound waves, and the transmitting and receiving unit being arranged such that the ultrasound waves transmitted by the transmitting and receiving unit travel in the at least one receptacle and in the at least one support element.

2. The fuel delivery unit as claimed in claim 1, wherein the transmitting and receiving unit is arranged in an upper end of the at least one support element in the installed position of the fuel delivery unit.

3. The fuel delivery unit as claimed in claim 2, wherein the at least one support element is arranged with its upper end in a bush of the flange, and the transmitting and receiving unit is arranged in the flange.

4. The fuel delivery unit as claimed in one of claims 3, wherein the bush defines an opening providing a connection between the interior of the at least one support element and the surroundings in the fuel tank.

5. The fuel delivery unit as claimed in one of claims 4, wherein the opening in the bush is a bore.

6. The fuel delivery unit as claimed in claim 3, wherein the transmitting and receiving unit is arranged in the bush for the at least one support element.

7. The fuel delivery unit as claimed in claim 1, wherein the transmitting and receiving unit is arranged in a lower region of the at least one receptacle in which the at least one support element is received in the installed position of the fuel delivery unit.

8. The fuel delivery unit as claimed in claim 7, wherein the transmitting and receiving unit is arranged on the base of the at least one receptacle for the support element in the installed position of the fuel delivery unit.

9. The fuel delivery unit as claimed in claim 1, wherein the transmitting and receiving unit is connected cohesively to one of the flange and the swirl pot by one of extrusion coating, welding, and adhesive bonding.

10. The fuel delivery unit as claimed in claim 1, wherein the transmitting and receiving unit comprises evaluating electronics configured to generate an electrical signal corresponding to the filling level based at least in part on the ultrasound waves.

11. The fuel delivery unit as claimed in claim 10, wherein the evaluating electronics are arranged remote from the transmitting and receiving unit.

12. The fuel delivery unit as claimed in one of claim 11, wherein the evaluating electronics are arranged in the flange.

13. The fuel delivery unit as claimed in claims 1, wherein the at least one support element and the at least one receptacle have a same cross-sectional shape.

14. The fuel delivery unit as claimed in claims 13, wherein the cross-sectional shape is one of circular, oval and rectangular.

* * * * *